United States Patent [19]
Harigaya et al.

[11] Patent Number: 5,875,298
[45] Date of Patent: *Feb. 23, 1999

[54] RECORDING-REPRODUCTION APPARATUS

[75] Inventors: Isao Harigaya, Yokohama; Koji Takahashi, Chigasaki, both of Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 700,162

[22] Filed: Aug. 20, 1996

Related U.S. Application Data

[63] Continuation of Ser. No. 164,141, Dec. 9, 1993, Pat. No. 5,583,791.

[30] Foreign Application Priority Data

Dec. 11, 1992 [JP] Japan ..................................... 4-353335
Dec. 24, 1992 [JP] Japan ..................................... 4-344554

[51] Int. Cl.$^6$ ................................................. H04N 1/413
[52] U.S. Cl. .................... 395/200.32; 395/500; 395/501; 348/416
[58] Field of Search ........................ 364/514 A; 348/575, 348/588, 416; 345/119, 148; 358/343; 370/58.1; 395/200.32, 500, 501, 504, 481

[56] References Cited

U.S. PATENT DOCUMENTS 4,947,257  8/1990  Fernandez et al. ..................... 348/585
5,028,917  7/1991  Imanishi et al. ........................ 345/148

Primary Examiner—Thomas Peeso
Attorney, Agent, or Firm—Morgan & Finnegan, L.L.P.

[57] ABSTRACT

When moving image information is reproduced from a recording medium as a recording medium to record moving image information, the number of reading portions in the recording medium is set and the moving image information is read out from read addresses corresponding to the number of reading portions which was set, thereby enabling the retrieving operation of the image information to be efficiently executed.

9 Claims, 17 Drawing Sheets

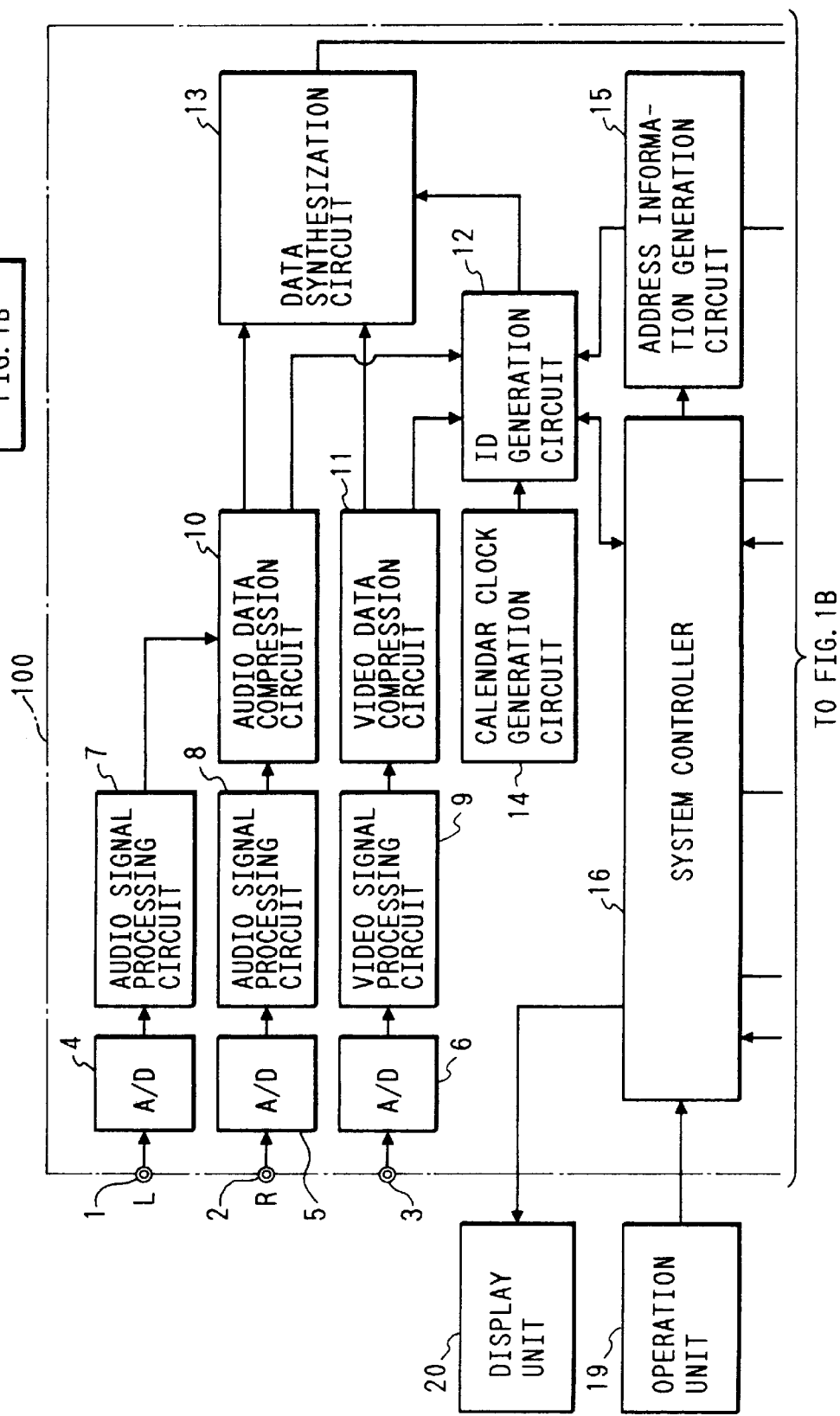

FIG. 2A
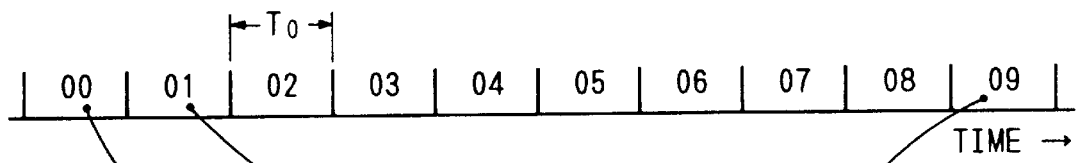
FIG. 2B MAIN MEMORY
| BLOCK 00 | BLOCK 01 | | BLOCK 09 |
| BLOCK 10 | BLOCK 11 | | BLOCK 19 |
| BLOCK 20 | BLOCK 21 | | BLOCK 29 |
| BLOCK 30 | BLOCK 31 | | BLOCK 39 |
| BLOCK 70 | BLOCK 71 | | BLOCK 79 |
| BLOCK 80 | BLOCK 81 | | BLOCK 89 |
| BLOCK 90 | BLOCK 91 | | BLOCK 99 |
FIG. 2C
FIG. 2D
| ID | TIME CODE | IMAGE QUALITY MODE | VIDEO DATA LENGTH | VIDEO HEAD ADDRESS | AUDIO QUALITY MODE | AUDIO DATA LENGTH | AUDIO HEAD ADDRESS | ERASE-FINISHED FLAG |

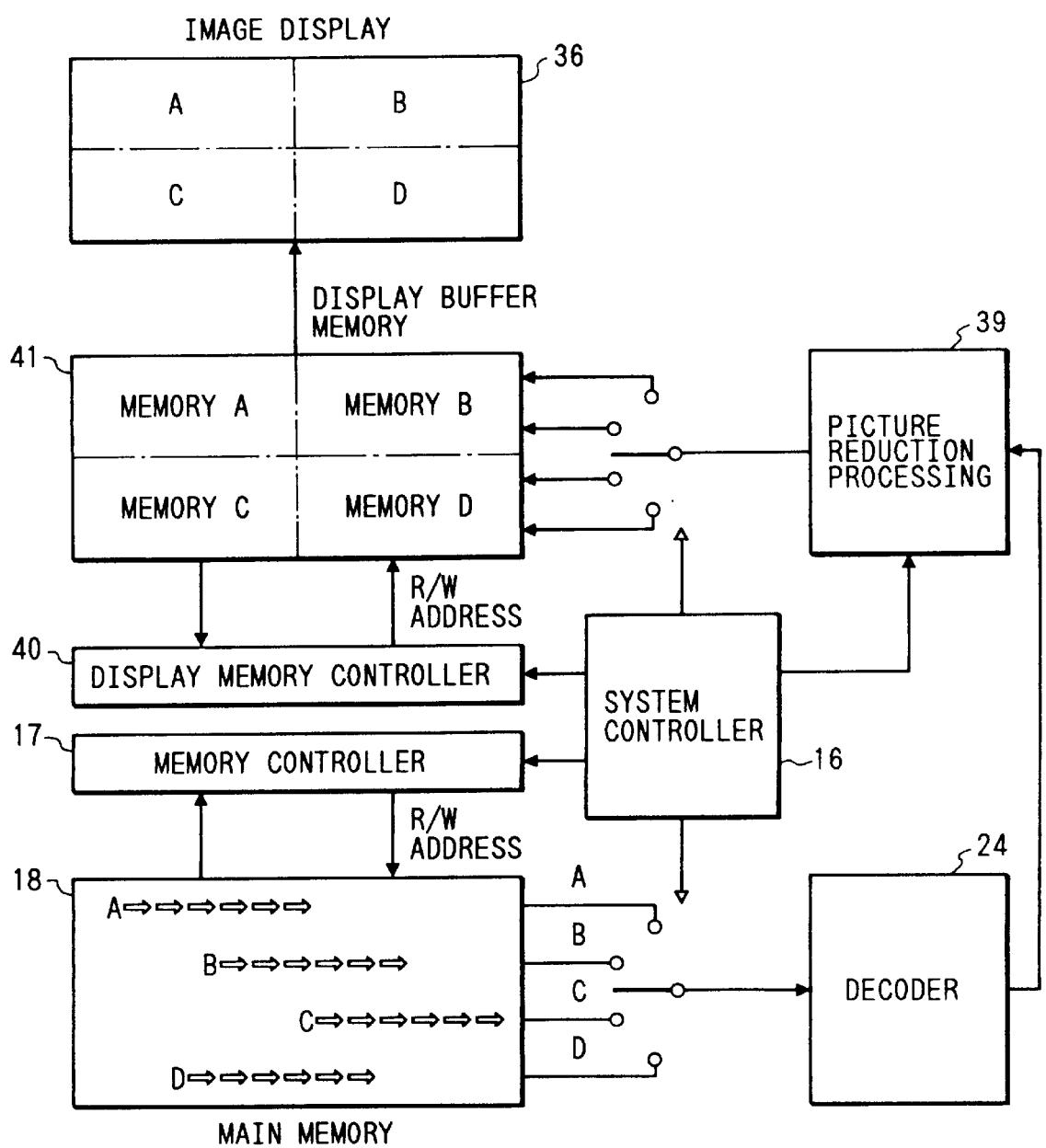

| k = 1 | k = 2 |
| k = 3 | k = 4 |

| k = 1 | k = 2 | k = 3 |
| k = 4 | k = 5 | k = 6 |
| k = 7 | k = 8 | k = 9 |

| k=1 | k=2 | k=3 | k=4 |
| k=5 | k=6 | k=7 | k=8 |
| k=9 | k=10 | k=11 | k=12 |
| k=13 | k=14 | k=15 | k=16 |

| k=1 | k=2 | k=3 | k=4 | k=5 |
| k=6 | k=7 | k=8 | k=9 | k=10 |
| k=11 | k=12 | k=13 | k=14 | k=15 |
| k=16 | k=17 | k=18 | k=19 | k=20 |
| k=21 | k=22 | k=23 | k=24 | k=25 |

| 1 | 2 | 3 | 4 | 5 | 6 | 7 | 8 | 9 | 10 |
| 11 | · | | | | | | | | |
| | | · | | | | | | | |
| | | | · | | | | | | |
| | | | | · | | | | | |
| | | | | | · | | | | |
| | | | | | | · | | | |
| | | | | | | | · | | |
| | | | | | | | | 99 | 100 |

N = 100, v = 1

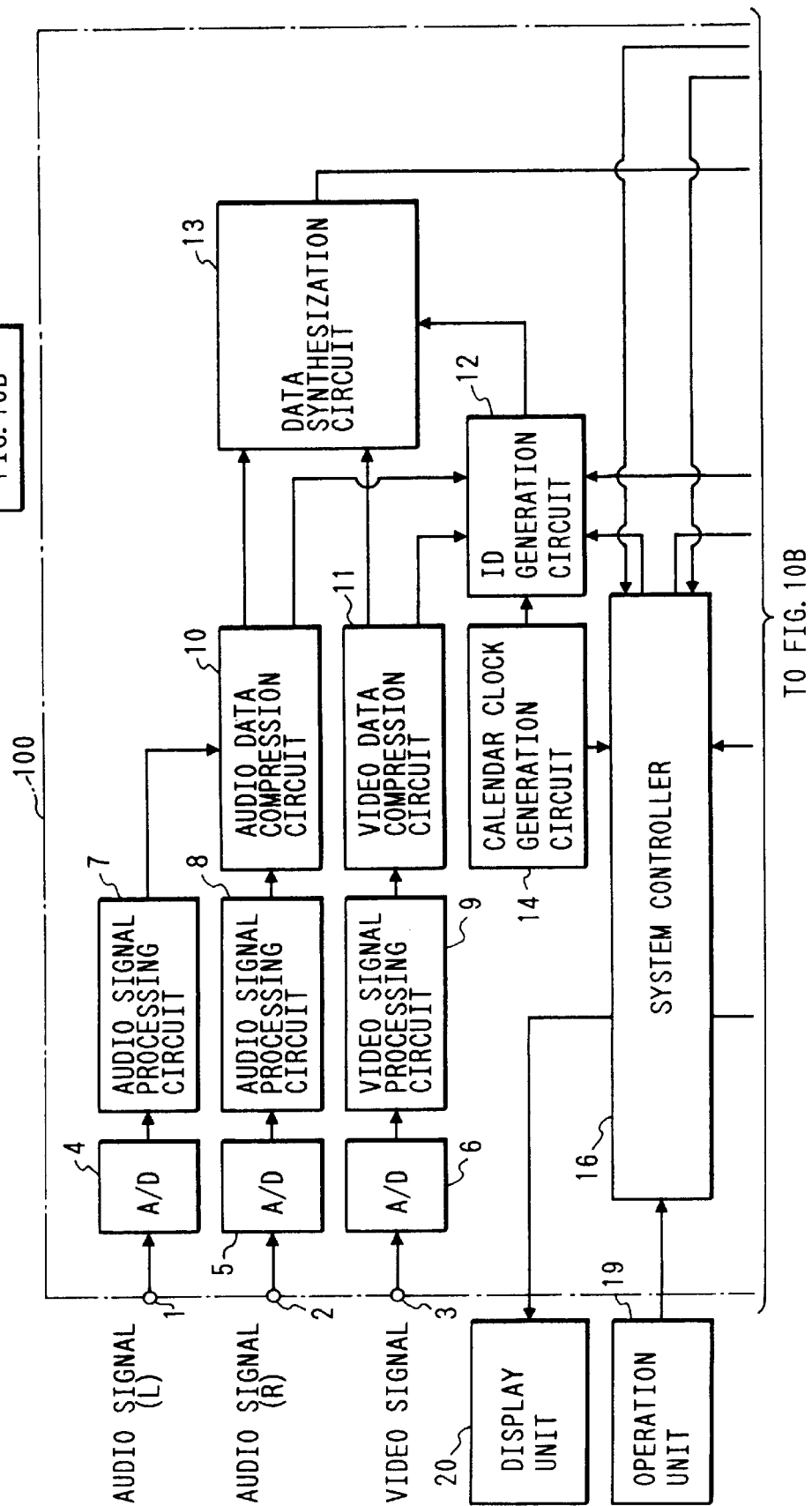

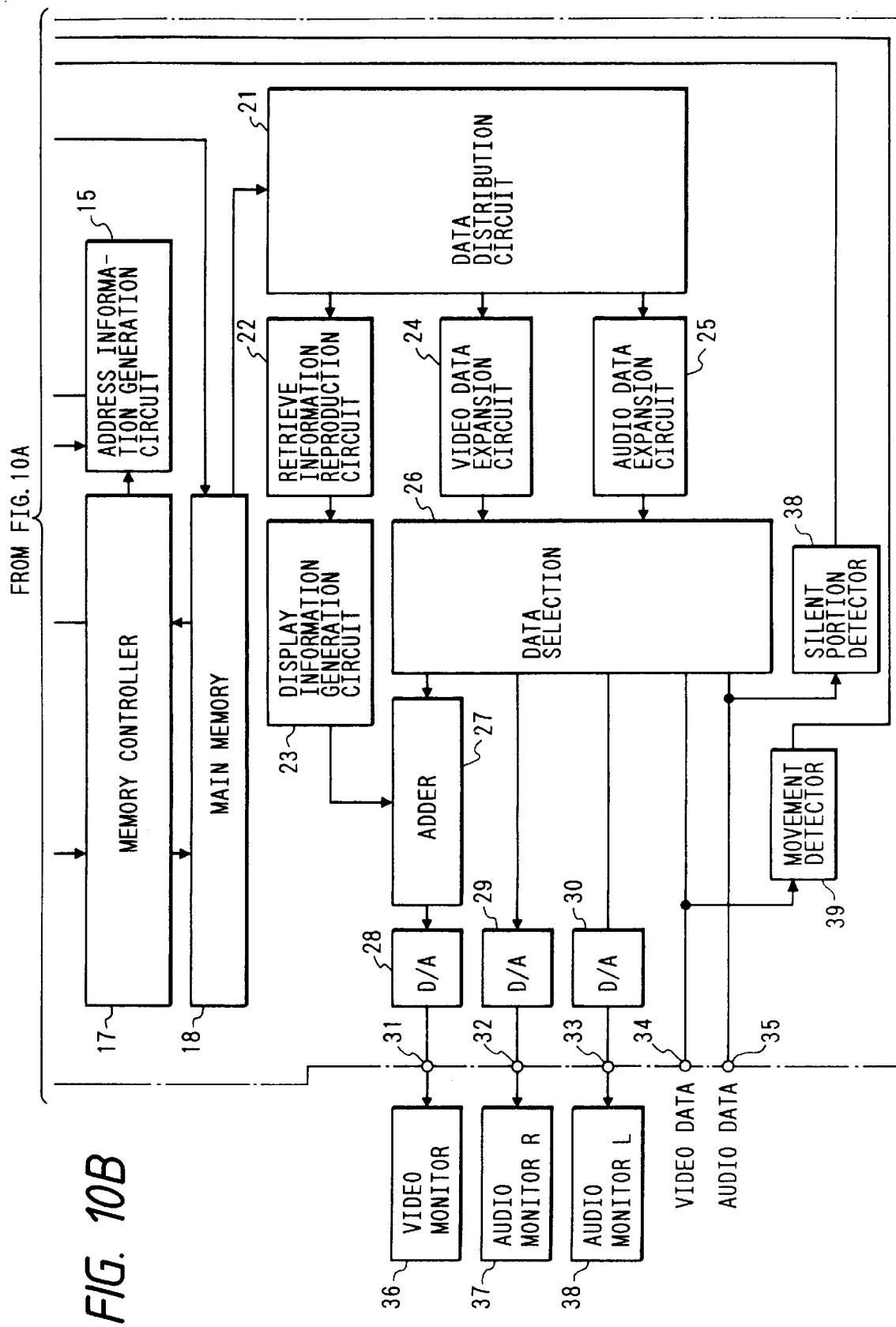

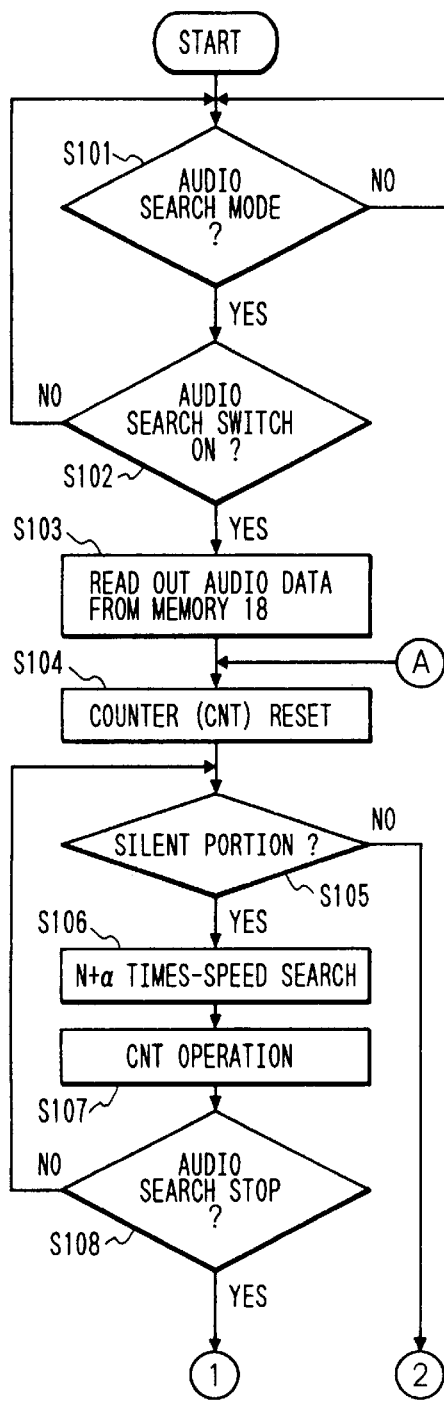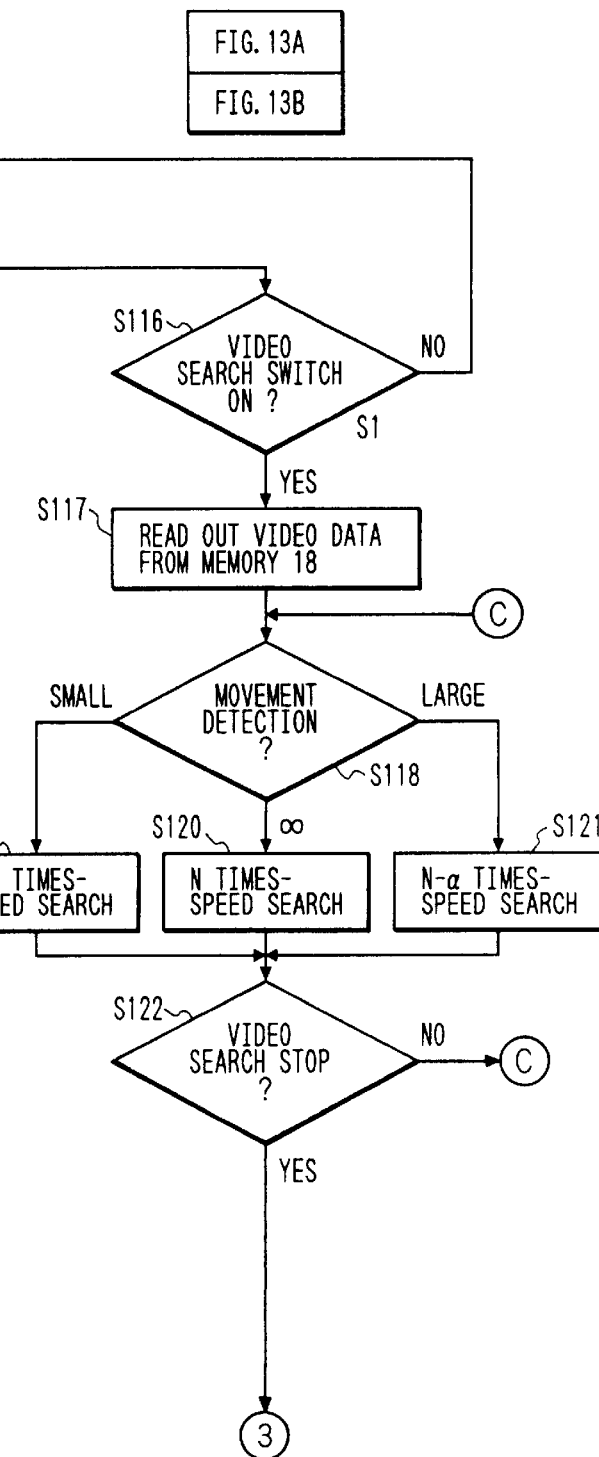
FIG. 13A
FIG. 13
| FIG. 13A |
| FIG. 13B |

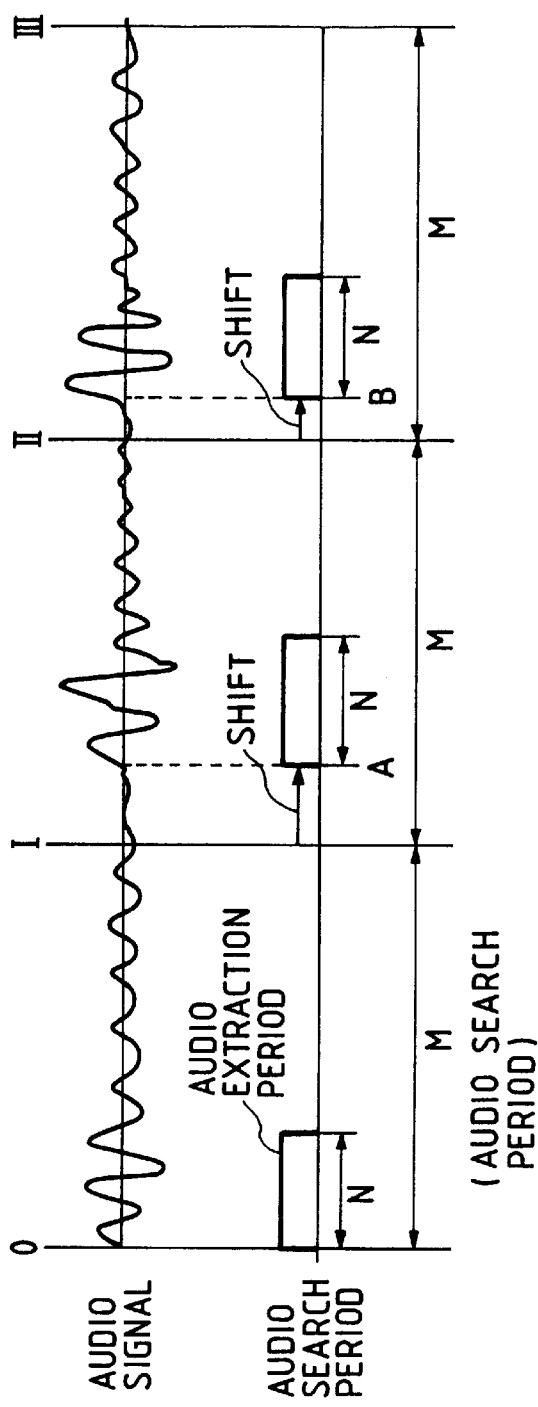
FIG. 14A
FIG. 14B
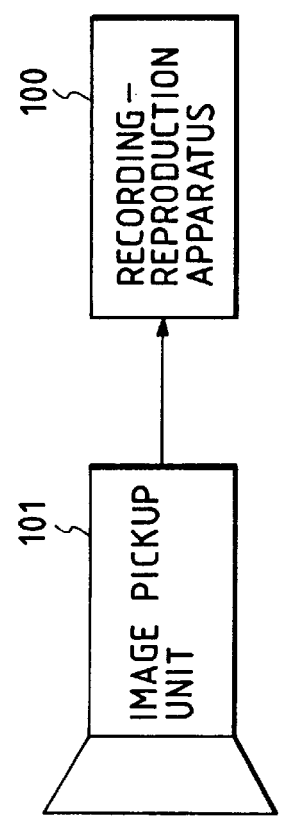
FIG. 16

RECORDING-REPRODUCTION APPARATUS

This is a continuation of application Ser. No. 08/164,141 filed Dec. 9, 1993, now U.S. Pat. No. 5,583,791.

BACKGROUND OF THE INVENTION

1. Field of the Invention

The invention relates to a recording-reproduction apparatus of image/audio information or the like and, more particularly, to a recording-reproduction apparatus which can improve a retrieving efficiency.

2. Related Background Art

Hitherto, in case of recording or reproducing a moving image signal, what is called a VTR (video tape recorder) using a magnetic tape having a width of ½ inch or 8 mm is generally used.

Such a VTR records or reproduces video information of one field onto one track on a magnetic tape wound around a rotary drum by using a rotary head provided on the rotary drum. In case of retrieving a video image, namely, performing what is called a head search by such a VTR, the retrieving operation is executed while actually reproducing the recorded video information by using a function such as fast forward control, rewinding control, special playback, or the like by using an index signal for head search of a video scene.

However, in case of retrieving by the conventional VTR, since the video signal has been recorded on a tape-shaped recording medium, it takes a time to move the tape in order to retrieve a desired video image. A long time and much labors are needed for the retrieving operation according to circumstances.

On the other hand, since the rotary head traces the track while always rubbing the tape during the retrieving operation, an adverse influence is also exerted on the reliability of the recording information due to the abrasion, scratch, or the like of the tape.

SUMMARY OF THE INVENTION

It is an object of the invention to solve the problems as mentioned above.

Another object of the invention is to provide a recording-reproduction apparatus which can efficiently retrieve information of an image, audio, or the like.

Under such objects, according to the invention, as one preferred embodiment, there is provided a reproducing apparatus comprising: (a) a recording medium which is used to record moving image information and which includes a solid-state recording member; (b) setting means for setting the number (N) of reading portions on the solid-state recording member (N: natural number); and (c) reading means for reading out the moving image information from the N portions in the solid-state recording member, respectively.

The above and other objects and features of the present invention will become apparent from the following detailed description and the appended claims with reference to the accompanying drawings.

BRIEF DESCRIPTION OF THE DRAWINGS

FIG. 1, when FIGS. 1A and 1B are combined as illustrated, shows a block diagram showing a construction of a recording-reproduction apparatus as a first embodiment of the invention;

FIGS. 2A to 2D are diagrams showing a storing state of data in a main memory in the first embodiment;

FIG. 3 is a diagram showing picture planes for retrieval in the first embodiment;

FIGS. 6A to 6F are diagrams for explaining a retrieval speed S in the first embodiment;

FIG. 10, when FIGS. 10A and 10B are combined as illustrated, shows a block diagram showing a construction of a recording-reproduction apparatus as a second embodiment of the invention;

FIG. 13, when FIGS. 13A and 13B are combined as illustrated, shows a flowchart for explaining the retrieving operation of an audio image in the second embodiment;

FIGS. 14A and 14B are time charts for explaining the timer skip audio search operation;

FIG. 16 is a diagram showing a camera integrated type recording-reproduction apparatus to which the recording-reproduction apparatus of the invention is applied.

DETAILED DESCRIPTION OF THE PREFERRED EMBODIMENTS

An embodiment of the invention will now be described hereinbelow with reference to the drawings.

Figure 1B:
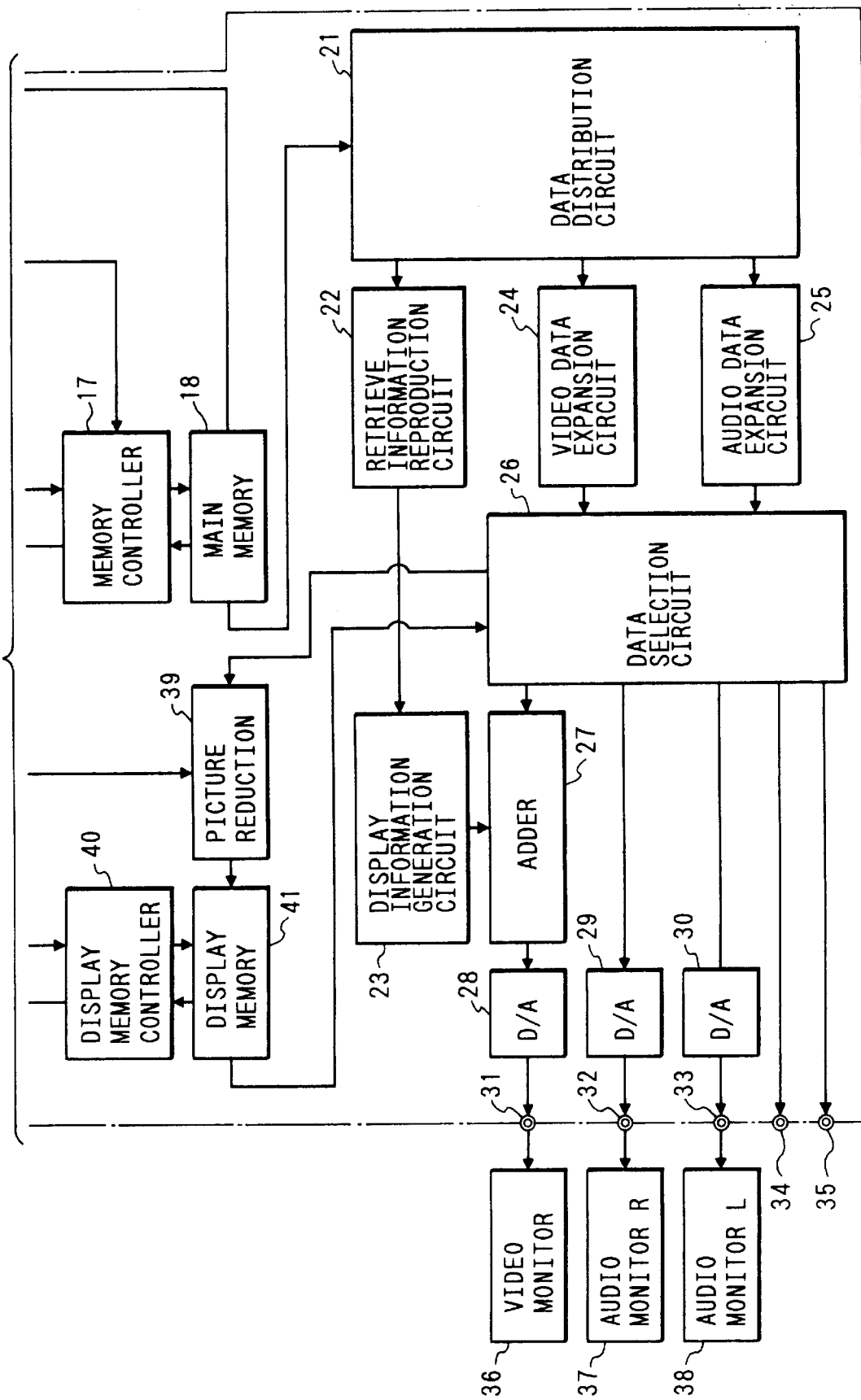

FIGS. 1A and 1B are block diagrams showing a construction of a recording-reproduction apparatus according to the first embodiment of the invention.

In FIGS. 1A and 1B, stereophonic audio signals of the L and R channels are supplied from audio signal input terminals 1 and 2 and are converted into digital audio signals by A/D converters 4 and 5.

Processes such as elimination of various kinds of noises, level adjustment, band limitation, and the like are executed to the digital audio signals by audio signal processing circuits 7 and 8, respectively. A data compressing process for an audio signal such as a subband encoding or the like using, for example, a frequency masking effect of the auditory sense is executed to the above processed digital audio signals by an audio data compression circuit 10.

On the other hand, the video signal of a video image or the like supplied from a video signal input terminal 3 is converted into a digital video signal by an A/D converter 6.

A data amount of the digital video signal is compressed by a video data compression circuit 11 by using a well-known technique such as DCT, VLC, or the like.

Such a compressing method can be realized by, for example, properly combining an interframe correlating process using a time-dependent image correlation, a movement vector compensation to reduce a deterioration of the picture quality in such a method, and further a both-side predictive interframe compression which is executed from time points before and after (past and future) of the present time with respect to a time base, and the like. Specifically speaking, a picture quality about a standard picture quality of what is called a ½ inch VTR can be assured by so called an MPEG-1 as an algorithm proposed by the MPEG (Moving Picture Image Coding Experts Group).

The above audio data and video data are synthesized to data from an ID generation circuit 12, which will be explained hereinlater, by a data synthesization circuit 13 and the resultant data is stored into a main memory 18.

Memory addresses, the writing/reading operations, and the like of the main memory 18 are controlled by a memory controller 17.

The memory controller 17 is controlled by a system controller 16 and the operation for recording, reproduction, retrieval, or the like is executed.

That is, when an instruction for the recording, reproduction, retrieval, or the like is supplied from an operation unit 19 to the system controller 16, the system controller 16 executes the writting/reading control of data to the memory controller 17. Information indicative of a situation of the instructed operation, a time node indicative of the recording/reproducing time and the like, etc. is displayed to a display section 20. Information of such a time code and the like is also informed to an address information generation circuit 15.

There are mainly two kinds of time codes. The first time code indicates the elapsed time from the head of a recording medium or a video program and the accumulating time of the photographing operation of the camera. The second time code indicates the time of the date (year, month, day) when the recording operation is performed or the photographing operation by the camera is executed and the time of a (hour, minute, second) frame. In the embodiment, a calendar clock generation circuit 14 is provided to generate the latter (second) time code.

The address information generation circuit is subsequently receives the data indicative of the information storing situation and the like from the memory controller 17 through the system controller 16 and transfers the data to the ID generation circuit 12 as information indicative of the data amount of various kinds of information and the like stored in the main memory 18.

As for the contents of the above data, for instance, the time code and the information regarding the mode selection of the picture quality and audio quality and the like are formed on the basis of the information from the system controller 16, a data amount (data length in case of the variable length encoding) of the video and audio information and the head address value in the memory to store the data are formed on the basis of the information from the memory controller 17, those data is transferred to the ID generation circuit 12 and combined as an ID of one data block every ID, and a data block is constructed by the data synthesization circuit 13 together with the audio and image data. The head addresses in the main memory in which the audio and image data in the data blocks have been stored are sequentially written in the ID.

The main memory 18 using a solid-state memory device as a recording medium will now be described.

In recent years, the advancement of the semiconductor technique is remarkable. When seeing a flow of an integration degree of semiconductors, the memory capacity is increased by four times for every period of almost three years. On the other hand, various kinds of methods of compressing information have been proposed. There is also a tendency such that the prices of the semiconductors are remarkably decreased due to a mass producing effect. When considering the above points, the semiconductor memory which can write only still images so far will be able to also store moving images and will be able to be put into practical use as a recording medium of the recording-reproduction apparatus.

According to the invention, the main memory 18 is constructed by using a solid-state memory device of a large capacity by the latest semiconductor technique, and when a moving image is stored by using a high efficiency compressing method and a variable speed search or an edition is executed, the video information, audio information, and retrieval information are written into the solid-state memory device as a data block of the minimum memory unit, thereby improving an operating efficiency upon edition and raising a retrieval speed also allowing a limited memory area to be efficiently occupied by an address management of the memory.

An example of a data storage in the main memory 18 constructed by a solid-state memory will now be practically described in detail with reference to FIGS. 2A to 2D.

FIG. 2A shows a state in which an axis of abscissa indicates the time base and an ID signal is produced for every predetermined period ($T_0$).

FIG. 2B shows a conceptual diagram of an address space in the main memory 18. The video and audio information data is sequentially stored after the ID signal as shown in the diagrams.

A data length of ID is a fixed length. In the embodiment, the ID has total eight kinds of fundamental information (FIG. 2D).

For example, an ID (block No.), a time code according to the SMPTE (Society of Motion Picture and Television Engineers), an image quality mode such as standard, long time, or the like, an image data length, a video head address of the image data, an audio quality mode, an audio data length, an audio head address of the audio data, and an erase-finished flag indicating whether each data has already been erased or not are stored in the data area of the ID.

The erase-finished flag is used when a physical recording erasure is not executed, namely, when the data stored in the main memory 18 is not cleared but the recorded information is logically erased, that is, the data stored in the main memory 18 is not outputted.

The ID data with the above construction, the video data, and the audio data construct one set of data block. FIG. 2C shows such a state.

The reproducing operation of the video and audio information recorded as mentioned above will now be described.

When the reproducing operation is instructed by the operation unit 19, the system controller 16 displays a message indicating that the reproducing operation is being executed to the display unit 20. The memory address and the reading/writing operations are controlled by the memory controller 17. The information signal (video information, stereo audio information, and ID information to retrieve them) stored by the foregoing recording operation is read out from the main memory 18.

The read-out data is supplied to a data distribution circuit 21 in a state (serial data state) in which the foregoing three kinds of data were mixed. In case of such a data format, the main memory can be expanded or a memory format such as an exchangeable IC card or the like can be also used.

The data is distributed by the data distribution circuit 21 in the following manner.

A retrieve information reproduction circuit 22 generates the ID information as shown in FIG. 2D mentioned above for every block. Display information for monitor is generated from a display information reproduction circuit 23 and is synthesized by an adder 27 to the reconstructed video information which is generated from a data selection circuit 26, which will be explained hereinlater.

The synthesized information is converted into the general analog signal by a D/A converter 28 and is displayed to a video monitor 36 through an output terminal 31.

The video data is supplied to a video data expansion circuit 24 from the data distribution circuit 21. The expansion circuit 24 executes a data expanding process opposite to the compressing process which was executed upon recording, thereby converting into the video signal of the original format.

The expanded video signal is supplied to the data selection circuit 26. The data selection circuit 26 supplies the video signal to the adder 27 to synthesize the display signal for the reproducing monitor and to a digital video output terminal 34.

The audio data from the data distribution circuit 21 is supplied to an audio data expansion circuit 25. The expansion circuit 25 executes a data expanding process opposite to the data compressing process executed upon recording to the audio data in a manner similar to the video data, thereby converting into the audio signal of a format which is almost equivalent to that at the time of the inputting operation upon recording.

The converted audio signal is supplied to the data selection circuit 26. The data selection circuit 26 supplies the stereo audio signals of the right (R) and left (L) channels to D/A converters 29 and 30 and a digital audio output terminal 35.

An audio signal which is generated from the D/A converter 29 is sent to an audio monitor (R) 37 through an output terminal 32. The audio signal which is generated from the D/A converter 30 is sent to an audio monitor (L) 38 through an output terminal 33.

The retrieving operation of the embodiment will now be described in detail hereinbelow.

FIG. 3 shows a conceptual diagram of the display of a picture plane regarding the retrieving operation.

The video data stored in the main memory 18 is read out by the control by the memory controller 17 which operates in accordance with the system controller 16 and is reconstructed to the original video signal by the decoder (video data expansion circuit in FIG. 1B) 24.

In the embodiment, a plurality of video information are simultaneously displayed on the monitor 36 in order to attain efficiently retrieve.

As a display method, for example, in case of simultaneously displaying four picture planes, four read addresses are set and four picture planes of A, B, C, and D are formed from the read addresses.

The four read addresses corresponding to A, B, C, and D are sequentially repetitively set in a time divisional manner. Such setting operations are schematically shown in FIG. 3 like change-over operations of switches.

The video image is successively reproduced by the decoder 24 and is reduced into ¼ in order to simultaneously display four picture planes onto the monitor by a picture reduction processing circuit 39.

The reduced image data is sequentially stored into a buffer memory 41 for display. As mentioned above, such storing operations are schematically shown in FIG. 3 like change-over operations of switches. The actual operations are executed by controlling addresses in the display memory 41 under the control of a display memory controller 40 as instructed by the system controller 16.

When the reduced image data is stored into the buffer memory 41, the address in the memory area is divided into four portions as shown in the diagram and the reduced image data is sequentially time-divisionally written into the areas of A to D corresponding to the read addresses in the main memory, respectively.

In parallel with the writing operation, the reading operation is executed while sequentially increasing the address in the display memory in a manner similar to the scan of the ordinary television signal. As mentioned above, a plurality of moving image information are simultaneously displayed.

To realize the above operation, in case of simultaneously displaying (N) picture planes, it is necessary that the main memory is a memory having (N) multiports or a memory which can operate at a high speed and which has a reading speed that is substantially (N) or more times as large as the reading speed from a display memory.

The number (N) of divided picture planes is set by operating the operation unit 19 and is transferred from the system controller 16 to the picture reduction processing circuit 39 and the picture reducing process is executed in accordance with such a number (N).

A state in the main memory 18 in case of the N-divisional display will now be described with reference to FIG. 4.

Figure 4:
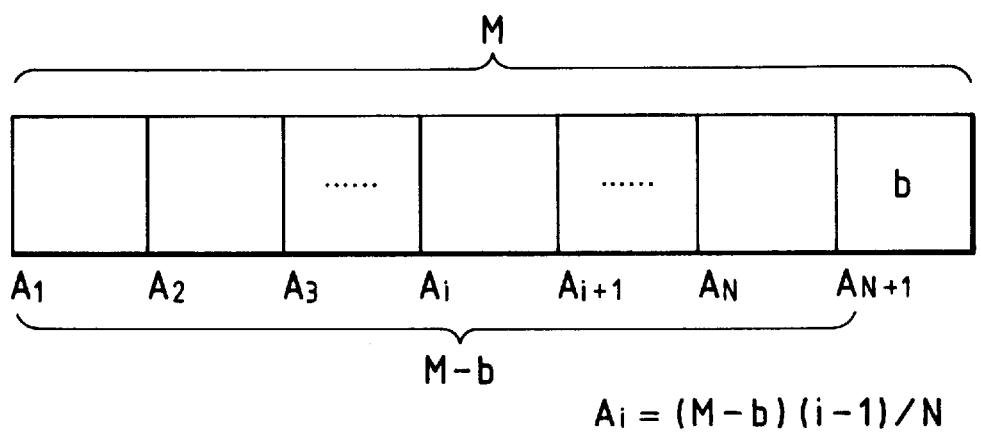
FIG. 4 is a diagram for explaining an example of a read address when a moving image is displayed in the first embodiment.

FIG. 4 is a conceptual diagram of a head read address in the main memory 18 corresponding to each image data in case of displaying a plurality of moving images as mentioned above.

Now, assuming that a whole memory capacity of the main memory 18 is set to (M) and a data amount corresponding to the unused invalid data (blank) portion is equal to (b), a data amount of a target to be retrieved is equal to (M−b).

The data amount (M−b) is divided into (N) equal parts and the head addresses of (N) retrieval areas are sequentially set to $A_1, A_2, ---, A_i, ---, A_N$ in accordance with the order from address 0 of the head address. Now, assuming that the head address of the i-th retrieval area is set to $A_i$, $A_i$ can be defined as follows.

$$A_i = (M-b)(i-1)/N$$

The reading operation of the image information is started from the head address $A_i$ of the retrieval area set as mentioned above. When the address reached a predetermined position of each retrieval area, the address is returned to the head address of each retrieval area and the reproducing operation for retrieval is continued.

A loop is formed at a predetermined position from the head address. The reproducing operation of this loop is repetitively executed until the next instruction is given.

When an instruction to stop the retrieval is generated from the operation unit 19 or a change in retrieval mode (for example, change in dividing number (N)) or the like is instructed, the retrieving operation is properly stopped and the operating mode is shifted to another operating mode.

Figure 5:
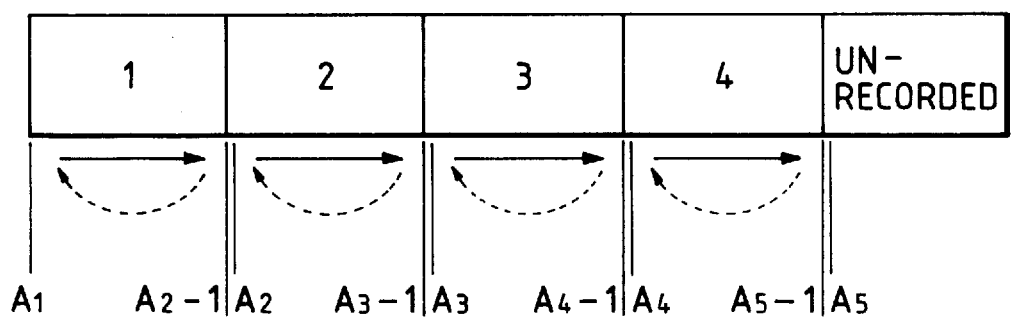
FIG. 5 is a diagram for explaining an example of a read end address when a moving image is displayed in the first embodiment.

As a method of setting a read end address to form the foregoing loop, as shown in FIG. 5, the last address $A_{(i+1)}-1$ of each retrieval area is set to an end address.

As mentioned above, when the retrieving operation is executed by a plurality of picture planes, no audio information is generated.

In the retrieving operation as described above, a reading speed of the image information according to an image displayed on each of the multipicture planes is the same as that in the normal reproducing mode.

Another retrieving operation in the embodiment will now be described. A concept of a retrieval speed (S) in the embodiment will be first explained in detail.

The number of multipicture planes when a plurality of moving image information are simultaneously displayed on the monitor screen as mentioned above is set to (N) and a frame rate of the moving image is set to (v).

The above frame rate denotes a time amount of the image information which is displayed in a unit time and is expressed by the number of frames upon retrieval for the number of frames in the normal reproducing mode.

For example, in case of displaying the image of the NTSC system onto the monitor screen at a rate of 30 frames per second without dropping any frame, the frame rate (v) is equal to v=30/30=1.

Since the reproduction is executed at a speed higher than the ordinary speed upon retrieval, no problem occurs even when the picture quality is deteriorated as compared with that in the ordinary reproducing mode. Therefore, a thin-out image such as an image which is obtained by synthesizing partial images, a frame-dropped image that is obtained by extracting a partial image for a predetermined period, or the like can be used.

For example, when the retrieval speed (S) is set to S=100 by operating the operation unit 19, in the embodiment, the values of (N and v) can be arbitrarily set so long as the conditions which satisfy S=N·v=100 are set.

As a combination of (N and v) having values near S=100, FIGS. 6A to 6F show several examples:

In case of FIG. 6A (N=1, v=100):

The image reproduced in the fast forward mode at a speed that is 100 times as high as the speed in the normal reproducing mode is displayed on the whole screen. The retrieval speed (S) in this instance is equal to 1×100=100 and coincides with the set value.

In case of FIG. 6B (N=4, v=25):

The ¼ reduced image reproduced in the fast forward mode at a speed that is 25 times as high as the speed in the normal reproducing mode is displayed on each of four divided picture planes comprising two picture planes in the vertical direction and two picture planes in the lateral direction. The retrieval speed (S) in this instance is equal to 4×25=100 and coincides with the set value.

In case of FIG. 6C (N=9, v=11):

The ⅑ reduced image reproduced in the fast forward mode at a speed that is 11 times as high as that in the normal reproducing mode is displayed on each of nine picture planes of (3×3 picture planes in the vertical and lateral directions). The retrieval speed (S) in this instance is equal to 9×11=99 and is almost equal to the set value.

In case of FIG. 6D (N=16, v=6):

The 1/16 reduced image reproduced in the fast forward mode at a speed that is six times as high as that in the normal reproducing mode is displayed on each of 16 divided picture planes of (4×4 picture planes in the vertical and lateral directions). The retrieval speed (S) in this instance is equal to 16×6=96 and is almost equal to the set value.

In case of FIG. 6E (N=25, v=4):

The 1/25 reduced image reproduced in the fast forward mode at a speed that is four times as high as that in the normal reproducing mode is displayed on each of 25 divided picture planes of (5×5 picture planes in the vertical and lateral directions). The retrieval speed (S) in this instance is equal to 25×4=100 and coincides with the set value.

In case of FIG. 6F (N=100, v=1):

The 1/100 reduced image reproduced at a speed similar to that in the normal reproducing mode is displayed on each of 100 divided picture planes of (10×10 picture planes in the vertical and horizontal directions). The retrieval speed (S) in this instance is equal to 100×1=100 and coincides with the set value.

From the various display formats described above, it is possible to select under the condition of the same retrieval speed. In this case, it is constructed so as to properly select in accordance with the screen size or kind of a monitor display which is used or a taste of the user or the like. In the embodiment, the thin-out image has actually been displayed. However, in the case where the reading speed of the image information from the main memory 18 is controlled by the memory controller 17, by reading out the image information at a reading speed corresponding to each frame rate shown in FIGS. 6A to 6F, the image which is not thinned out can be also displayed.

A discrimination signal of the screen size is received from a monitor display (not shown) and the number (N) of multipicture planes can be also automatically initially set.

In the embodiment, so long as the display portion of the image has a large area, moving image information of an extremely large change can be also recognized to a certain extent. When the display portion has a small area, however, it is difficult to recognize the visual information. Therefore, as mentioned above, when the dividing number (N) of the multi-display mode is large, the search speed is set to a slow speed as much as possible, thereby enabling the image to be easily seen.

Figure 7:
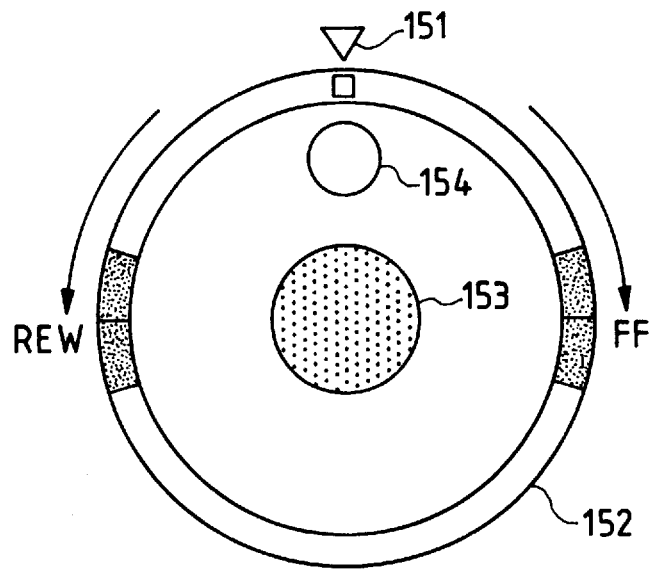
FIG. 7 is a diagram for explaining a jog operating section in the first embodiment.

In the embodiment, as for the retrieval speed, the reproducing speed (S) is set by rotating a shuttle ring 152 in the FF direction or the reverse REW direction shown by arrows in FIG. 7. The shuttle ring 152 is rotatably attached to a jog operation unit shown in FIG. 7 as a part of the operation unit 19. The formation of the image signal as mentioned above is controlled by such a rotation of the shuttle ring.

Operating members which are used in the embodiment will now be described with reference to FIG. 7.

A jog dial portion 154 having a small circular concave portion of the shuttle ring 152 and an STILL instruction switch 153 to freeze the retrieval picture plane are provided at the center. A triangle mark 151 indicative of a reference position of the zero speed is written in the upper portion of the shuttle ring.

The retrieving operation using the jog operation unit will now be practically described with reference to a flowchart of FIG. 8.

When the retrieving operation is started, a check is first made to see if the search dial 152 has been rotated in step S1 or not. When the search dial 152 is located at a reference position of the zero speed, it is determined that the searching operation is in the OFF state, so that step S8 follows.

If YES in step S1, it is determined that the searching operation is in the ON state, so that step S2 follows.

In step S2, a set value of the retrieval speed (S) mentioned above is detected.

The processing routine advances to step S3 and the number (N) of picture planes which are divided is set and step S4 follows. In step S3, the value of (N) is set by the foregoing method.

In step S4, the frame dropping speed (v) corresponding to the retrieval speed (S) and the set value of (N) is set by the system controller 16.

In the next step S5, the system controller 16 calculates the address value of the image to be displayed next on the basis of the numerical value set in each of the foregoing steps and updates the address.

In step S6, the new image information read out from the updated address is displayed on the monitor.

In step S7, a check is made to see if the STILL button 153 has been depressed or not. Namely, the operator checks the retrieval picture plane displayed on the monitor and when he finds out a desired image, the STILL button 153 is promptly depressed, thereby freezing the retrieval picture plane.

When the STILL button 153 is not depressed in step S7, the processing routine is returned to step S1 and the updating of the image display is continued. When the STILL button 153 is depressed, step S8 follows.

In step S8, the display block of the image in which a desired image is displayed is selected from the multipicture planes.

A method of selecting the display block of the image in which a desired image is displayed from among the multipicture planes will now be described.

Figure 9:
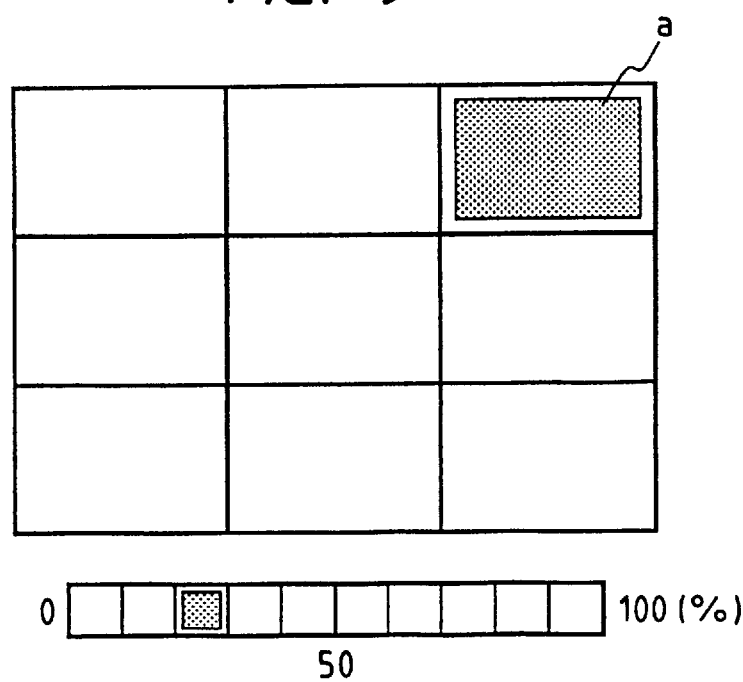
FIG. 9 is a diagram for explaining the retrieving operation in the first embodiment.

FIG. 9 is a display screen diagram when the display screen is divided into nine picture planes.

In FIG. 9, a frame (a) is displayed in one of the nine picture planes. The image of the picture plane in which the frame (a) is displayed is set to a target image. Upon selection of a block, the image block No. is selected so that the frame (a) is displayed in such a block.

As a block selecting method, the block No. is inputted by using the ten-key or it is also possible to use input means for inputting two-dimensional coordinates such as joystick, mouse, or track ball or the like which is integratedly provided for the operation unit 19, or the like. As another method, since just after the freezing operation was performed, the display frame is moved one block by one at a predetermined speed. Therefore, when the frame is located onto a desired image, the STILL button 153 is again depressed and the freezing operation is released. Thus, a desired image is fully displayed on the whole screen.

In step S9, the image selected in step S8 is reproduced at a standard reproducing speed.

In step S10, a check is made to see if the STILL button 153 has been depressed or not. Namely, if NO, it is determined that the reproduced image is proper and the reproducing operation is continued as it is as mentioned above. The retrieving operation, however, is finished as a result of the judgment in step S10.

On the other hand, when the STILL button 153 is depressed, it is decided that the image is not a desired image. The STILL button is released in step S11. After that, the processing routine is returned to step S1 and the above retrieving operation is continued.

Now, assuming that the maximum value of all of the effective data is equal to 100%, to which position in the data the memory address of the current frame display portion corresponds is shown by a bar display in the lower portion of the picture plane interlockingly with the frame display in step S9 (refer to FIG. 9). Thus, the positional relation in the data can be known.

Figure 8:
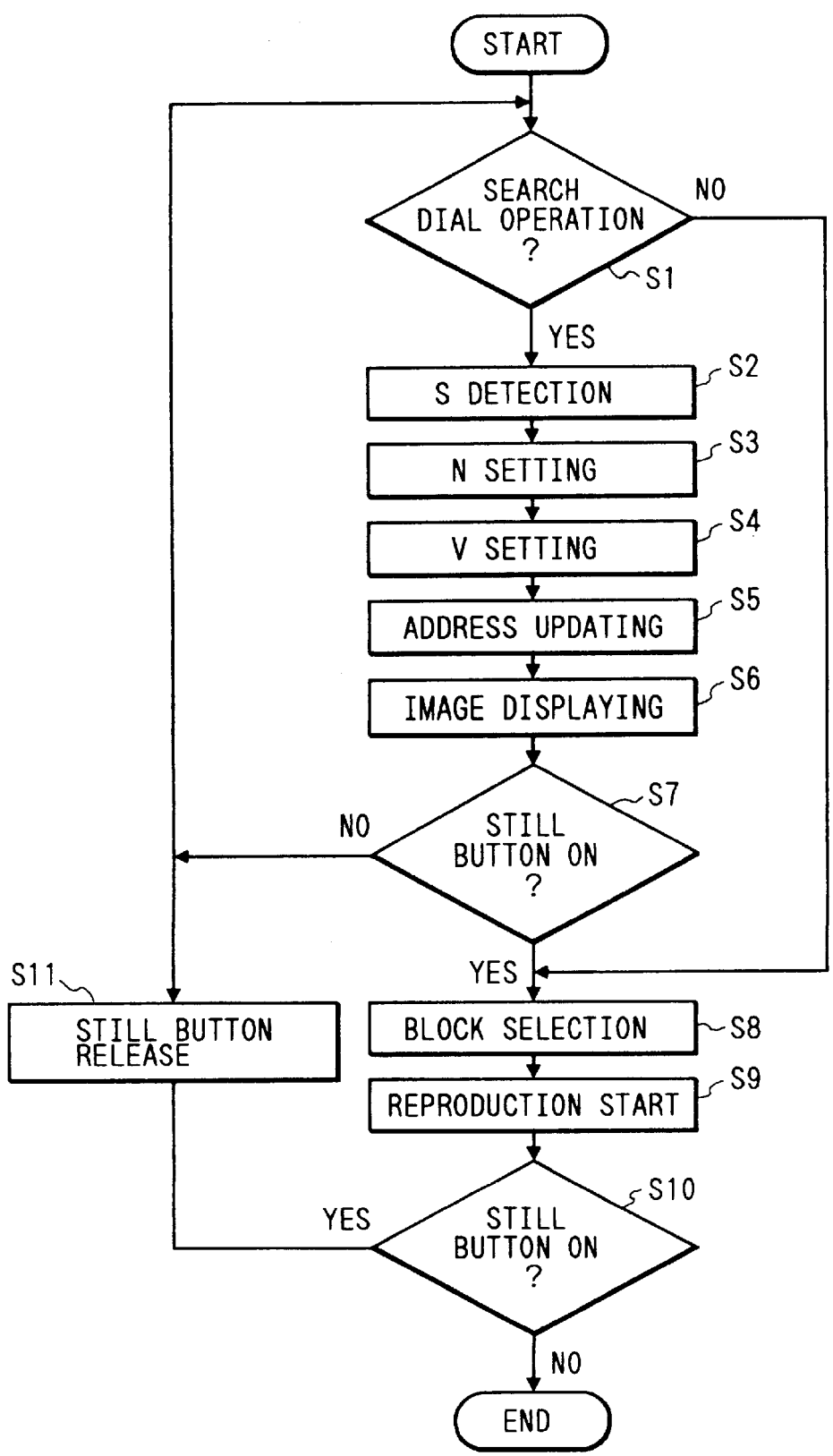
FIG. 8 is a flowchart for explaining the retrieving operation in the first embodiment.

In the retrieving flow of FIG. 8, the retrieval speed is first set and the number of divided picture planes is set. On the contrary, however, the number of divided picture planes can be also first set and the retrieval speed can be also subsequently set.

In the example shown above, the retrieving operations are executed for the whole effective area in the memory at almost the same timings. As another embodiment, explanation will now be made with respect to the case of applying the present system to the retrieval near the locations on the extension of the current retrieving position.

The searching operation is executed from the present position in one direction in a monotone increasing (decreasing) direction of the address in a manner similar to that mentioned above. The selection of the reproducing frame per unit time is controlled by a program so as to make it possible to easily see the selection regarding whether the operating mode is a mode for the high speed frame skipping reproduction in the whole screen display or the mode for the reduced picture plane display of N multipicture planes at a speed that is reduced into N/1.

Practically speaking, to execute the retrieval at a 100 times-speed, the image information for a period of 3000 frames is displayed by some method although 30 frames are displayed for one second in the normal reproducing mode.

For this purpose, the following method is considered. Namely, a partial image corresponding to 1/100 of each of the images of 100 frames is extracted and total 100 partial images are extracted and one image is synthesized. In this way, 30 images are displayed. Or, the image of only one frame is extracted per 100 frames and the frames of the other images are skipped. Or, the image whose area of the picture plane is reduced into 1/N and such (N) images are connected to thereby construct one picture plane. Each picture plane is updated every other 100/N picture planes at a rate of 30 times per second.

By enabling either one of the above methods to be properly selected, even when an address progressing distance per unit time is constant, the display screen for retrieval suitable for the environment of the user can be realized.

As described in detail above, according to the embodiment, none of the mechanical members as in the conventional VTR is used and a video image and an audio signal are recorded or reproduced by using the solid-state recording medium. Therefore, it is sufficient to perform only the address controls for the recording or reproducing operation, the recording or reproducing operation can be rapidly executed and the apparatus having an excellent retrieving efficiency of information can be constructed.

Particularly, since a plurality of moving image information are simultaneously displayed in the embodiment, there is an effect such that the efficient retrieval can be realized.

On the other hand, there are effects such that the display format suitable for a situation of the display apparatus, a taste of the person who retrieves, or the like can be selected while keeping the same retrieval speed and that the deterioration of the retrieving efficiency can be also prevented.

Further, the display format of the apparatus can be also automatically initially set to a visually preferable state in accordance with the screen size of the display which is used or the like. The apparatus of the invention can be fairly easily used as a retrieving apparatus of image information.

Although the embodiment has been described with respect to the forward reproduction and the search, according to the construction of the embodiment, by controlling the read address in the main memory 18, a reverse reproduction, reverse search, or the like can be also executed.

The second embodiment of the invention will now be described.

FIGS. 10A and 10B are block diagrams showing a construction of a recording-reproduction apparatus according to the second embodiment of the invention. In FIGS. 10A and 10B, component elements similar to those in FIGS. 1A and 1B are designated by the same reference numerals and their descriptions are omitted here.

In the second embodiment as well, the processed image, audio data, and ID are stored into the main memory 18 in a manner similar to the foregoing embodiment. An example of data storage in the main memory 18 and a data format in the second embodiment will now be described with reference to FIGS. 11A to 1D.

Figure 11A:
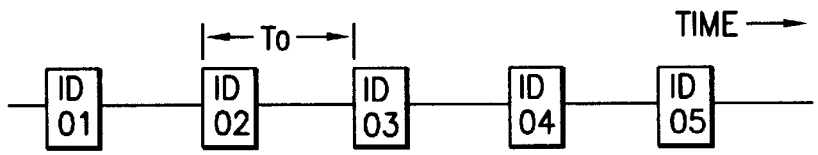
FIGS. 11A to 11D are diagrams showing storing states of data in a main memory in the second embodiment.

FIG. 11A shows a state in which an axis of abscissa indicates a time base and the ID data is formed at every predetermined period $T_0$.

Figure 11B:
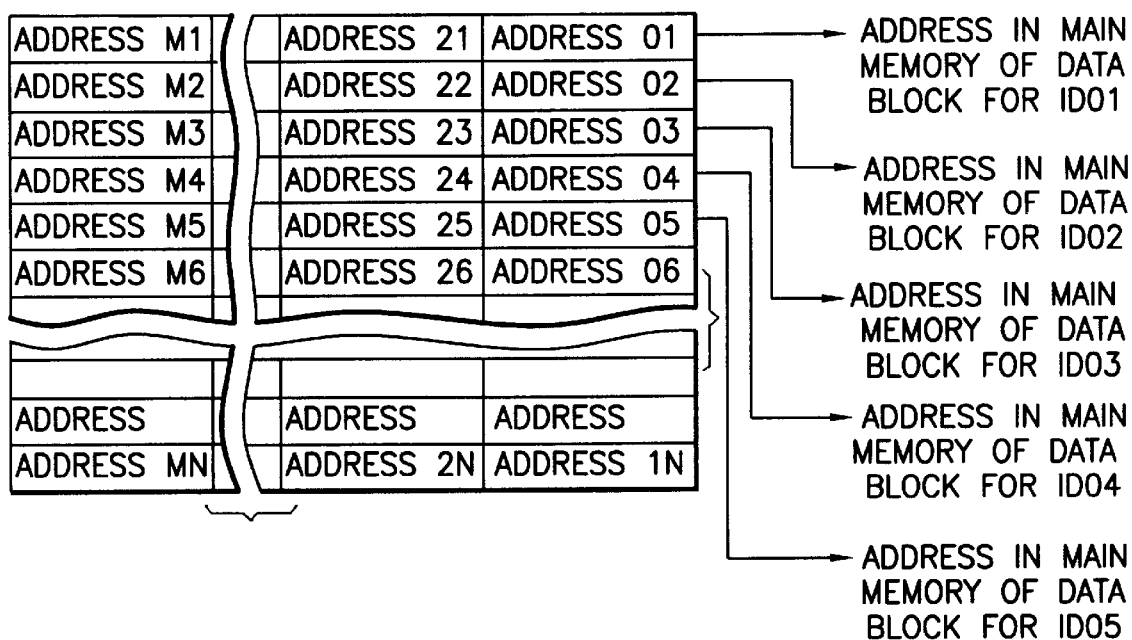
Figure 11C:
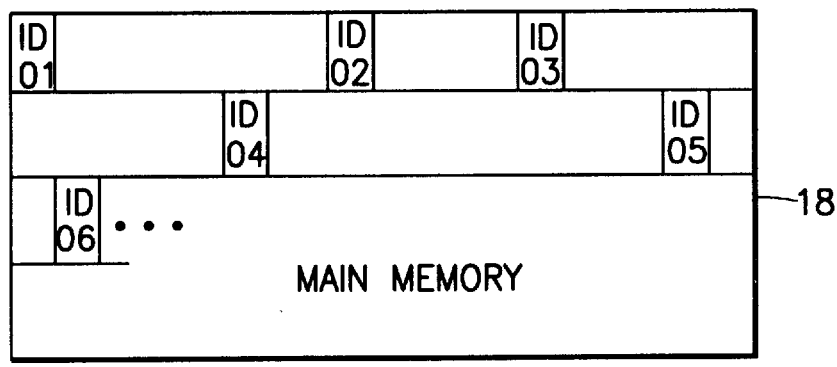
Figure 11D:
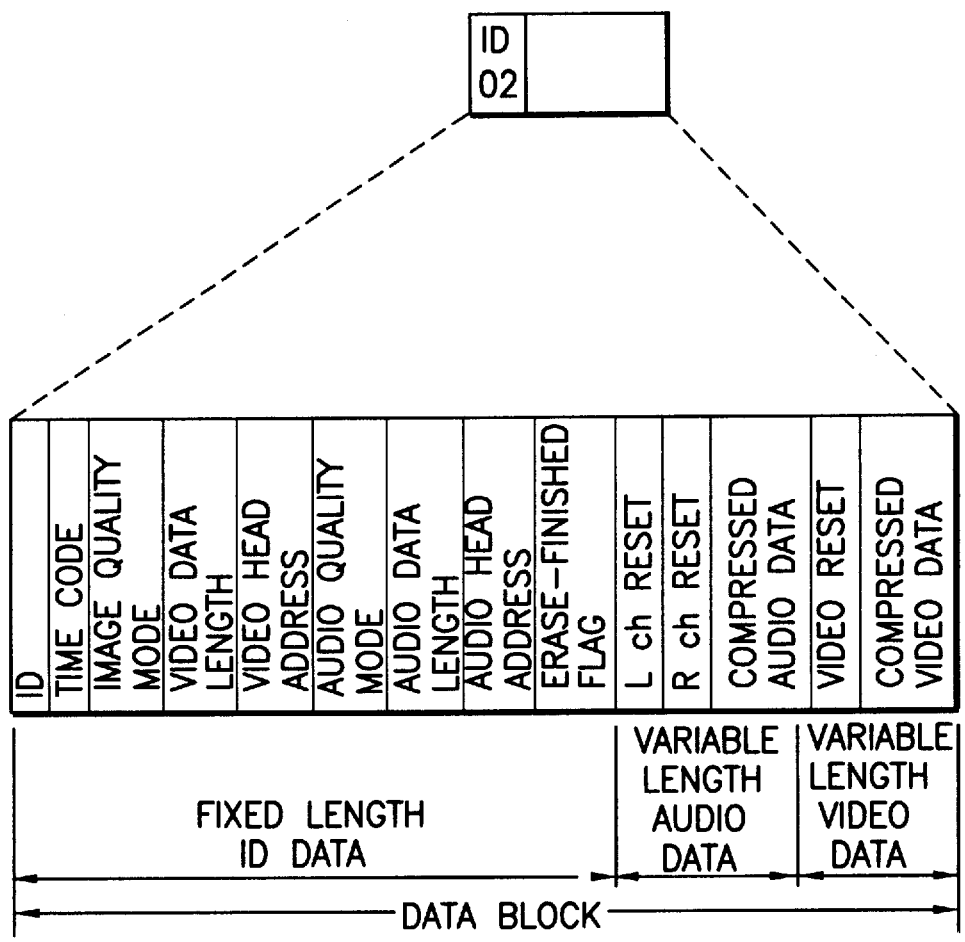

FIG. 11C shows a conceptual diagram of an address space of the main memory 18. As shown in the diagram, information data of a video image and an audio signal of a different data amount is sequentially stored after the ID data at every processing period by a variable length coding. Therefore, although the ID data is generated at the predetermined interval $T_0$ (for example, one second), the intervals are not equal on the memory as shown in the diagram.

Therefore, in order to enable the data block to be promptly accessed at the time of retrieval, in the embodiment, as shown in FIG. 11B, an ID file in which addresses indicative of the storing locations of the data blocks are combined is previously formed. According to the ID file, only the head addresses of the data blocks are orderly stored into preset areas in accordance with a memory capacity of the main memory 18.

In the second embodiment, in case of reading out the image and audio information from the main memory 18, the ID data recorded in the ID file is first read out, the address indicated in the head address information of the image and audio information in the ID data is set to the head, and the recorded image and audio information is read out there. The same shall also apply to the case of a retrieving mode, which will be explained hereinlater.

By constructing as mentioned above, the time to access to the address in which the image and audio information has been recorded is reduced in the retrieving mode.

Different from the image and audio data, the ID data in each data block has a fixed length. Even in the second embodiment, total eight kinds of fundamental information are provided.

The audio data is constructed by: initialization information (reset data) of each of the L and R channels; and compressed audio data of a variable length which was subjected to a compressing process. The video data is constructed by: an initialization picture plane (video reset data) by, for example, an intraframe coding or the like; and compressed video data which was variable length coded by various kinds of compressing methods.

The ID data and the video data and audio data having the above constructions form one set and construct the foregoing data block. The second embodiment is characterized in that the data block is formed at the interval $T_0$ defined on the time base.

Figure 12:
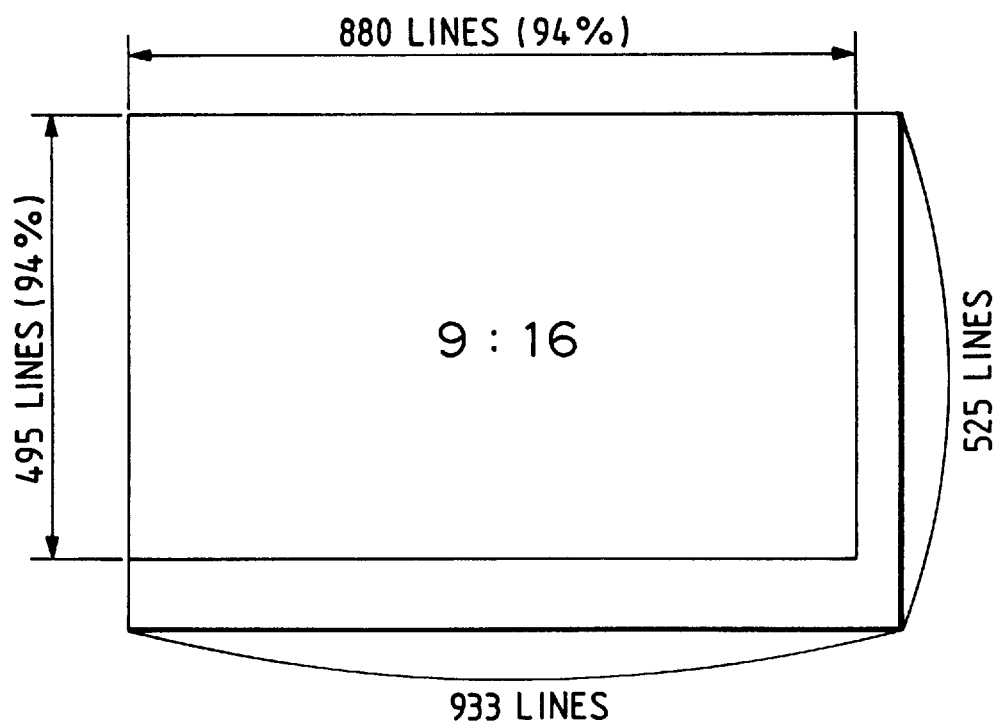
FIG. 12 is a diagram of a television screen for explaining an image signal.

FIG. 12 shows an example of a video signal which is handled in the embodiment. In the embodiment, a TV signal of the NTSC system (525 vertical scanning lines) is set to a fundamental signal and a TV signal of the aspect ratio (9:16) which is laterally long in which a ratio of the vertical direction to the lateral direction is close to the aspect ratio of the video screen is set to an input signal. Now, assuming that an effective ratio of the screen in each of the vertical and lateral directions is set to 94%, information of (495×880 pixels) of 30 picture planes is generated every second and is supplied to the input terminal 3 in FIG. 10A.

The composite video signal is converted into the digital data by the A/D converter 6. After that, the digital data is subjected to a signal process of a component (for example, pixel ratios Y:R-Y:B-Y=4:2:2) as necessary by a video signal processing circuit 9. When the luminance signal (Y) is quantized into eight bits per pixel and each of the color difference signals (R-Y, B-Y) is quantized into eight bits per pixel at a sampling rate of ½ of that of the luminance signal, about 700 Gbits are obtained in one hour.

Similarly, in case of digitizing the stereo audio signals at a rate of 48 kHz/16 bits, about 5.5 Gbits are obtained for one hour. By executing the foregoing compressing process to the stereo audio signals, total about 4 Gbits are obtained with respect to both of the image and audio data.

The reproducing operation of the embodiment will now be described.

When the reproducing operation is instructed by a reproduction key included in the operation unit 19, the system controller 16 displays a message indicating that the reproducing operation is being executed to the display unit 20. The memory address and the reading/writing operations are controlled by the memory controller 17. The information stored by the above recording operation is read out from the main memory 18.

In the reading mode, a predetermined amount of information is read out per unit time on the basis of the ID data. Speaking with regard to the above example, the video information of 30 picture planes, the stereo (or two channels) audio information of one second, and the ID data to retrieve them are read out per second.

In a mixed state (serial data information), the above three kinds of data are supplied to the data distribution circuit 21. Each of the above data is distributed by the data distribution circuit 21 as will be explained hereinbelow.

The ID data is added to the retrieval information reproduction circuit 22. Information as shown in FIGS. 11A to 11D is detected every ID. Information such as foregoing time code or the like is formed from the above information by the display information generation circuit 23 and is synthesized with the reproduced video information by the adder 27. The synthesized information is converted into the general analog signal by the D/A converter 28 and displayed by the video monitor 36.

A data expanding process opposite to the compressing process executed in the recording mode is executed to the video data by the video data expansion circuit 24, thereby reconstructing the video signal similar to the input signal upon recording. Data which is supplied to the adder 27 to synthesize the display signal for a reproducing monitor and to the digital video data output terminal 34 is generated from the data selection circuit 26.

The data expanding process opposite to the data compressing process upon recording is executed to the audio data by the audio data expanding circuit 25 in a manner similar to the video data, thereby reproducing the audio signal similar to the input signals upon recording. After that, the audio signal is supplied to the data selection circuit 26. The audio signal is transmitted to the D/A converter 29 to produce the audio signal for the audio monitor and to the digital audio data output terminal 33 by the data selection circuit 26.

From each of the video data and the audio data, a deviation due to the delay time or the like that is required for the reproducing a signal process is corrected by using the ID data mentioned above and, after that, each data is reproduced. Each of the reproduction signals of the video and audio is generated from the data selection circuit 26 synchronously with the information from the display information generation circuit 23.

A silent portion detector 38 to discriminate whether an audio information amount is large or not generates the result of the judgment of the silent portion or the presence of the sound to the system controller 16 as will be explained hereinlater. A movement detector 39 detects a difference between the original frame of the video information and the video image of the frame which is preceding to the original frame by one frame, thereby detecting a movement of the reproduced image. The result of the judgment is supplied to the system controller 16.

Figure 13B:
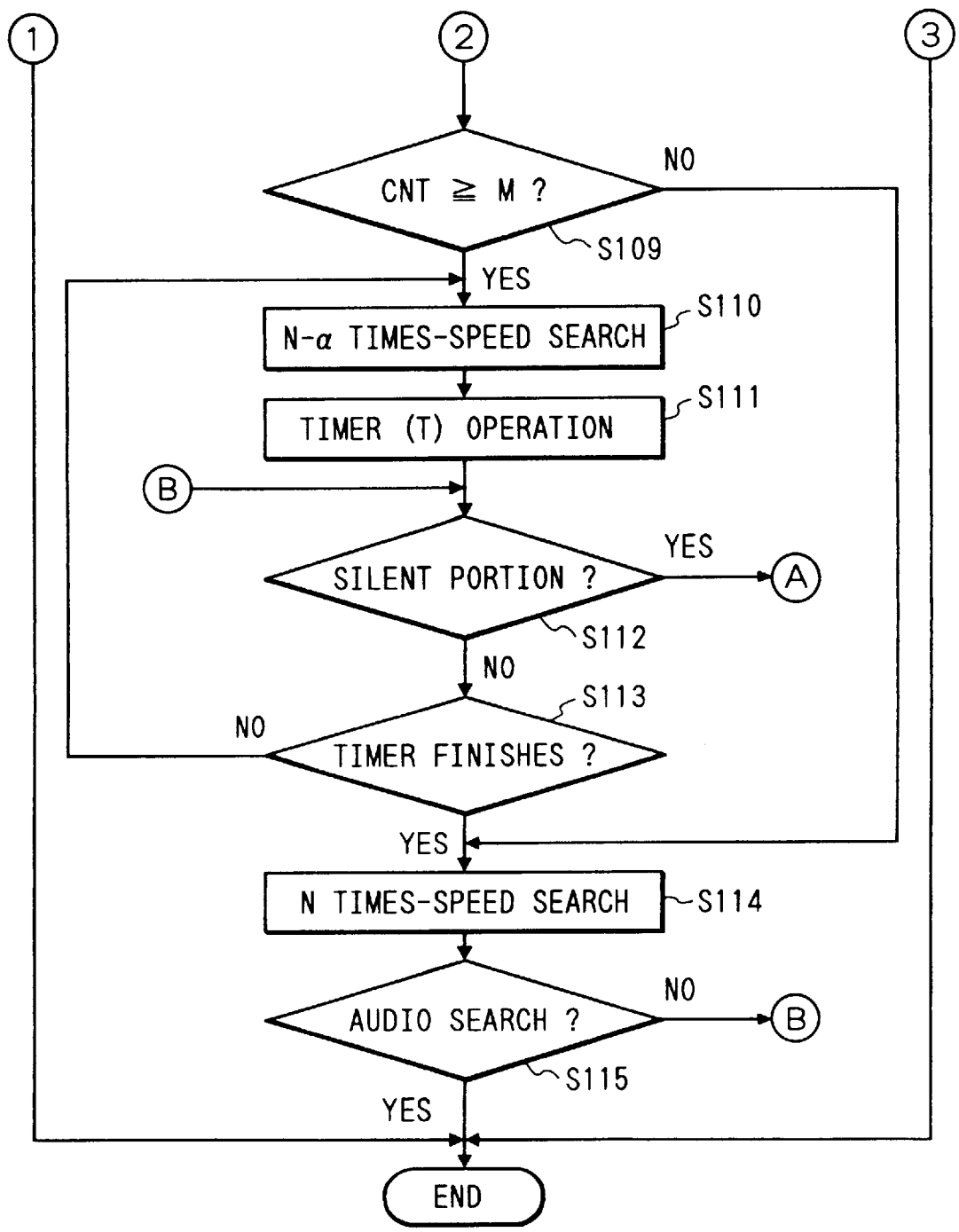

The operation in case of searching the audio and video data will now be described with reference to a flowchart of FIGS. 13A and 13B.

When a search mode switch included in the operation unit 19 is operated, the flow is started.

A check is made in step S101 to see if the audio search mode has been set or not. If YES, step S102 follows and a check is made to see if the audio search switch included in the operation unit 19 has been turned on or not. If NO in step S102, the processing routine is returned to step S101. When the audio search switch is turned on, step S103 follows and the audio data is read out from the main memory 18 at a read speed, which will be explained hereinlater.

In step S104, a counter (hereinafter, referred to as a CNT) provided in the system controller 16 is reset. In step S105, a check is made to see if the audio data read out in step S103 indicates a silent portion or not by the silent portion detector 38. If YES, step S106 follows and the searching operation is executed at a data reading speed from the main memory 18 that is (N+α) times as high as the normal speed by the control of the memory controller 17.

In step S107, the CNT is made operative to measure the time during the searching operation of the silent portion. In step S108, a check is made to see if an audio search switch has been turned off or not. For a period of time during which the audio data indicates the silent portion, a loop process in steps S105, S106, and S107 is executed.

In step S105, when the silent portion detector 38 detects that the audio data indicates the sound portion from the silent portion, the processing routine advances to step S109 from the above loop process. In step S109, a check is made to see if the value of the CNT is equal to or larger than a predetermined value (M) or not. When the value of the CNT is equal to or larger than the predetermined value (M), step S110 follows and the searching operation is executed at the (N−α) times-speed. That is, the speed is reduced by the speed that is only α times as slow as the speed in the (N) times-speed search and the sound which can be easily heard is reproduced.

In step S111, a timer to specify the period of time during which the (N−α) times-speed search is executed is made operative. Until the timer times over (step S113) or until the silent portion is detected (step S112), the above loop is repetitively executed.

The time of the above timer is determined by the value of the CNT.

In step S109, when the period of time of the silent portion is smaller than the reference value (M), or when the timer counts over in step S113, the processing routine advances to step S114 at a time point when the timer has finished to measure the sound portion, and the (N) times-speed search is executed. In step S115, a check is made to see if the audio search switch has been turned off or not. If NO, the processing routine is returned to step S112 and the loop process in steps S112 to S115 is executed.

If NO in step S101, step S116 follows and a check is made to see if the video search switch has been turned on or not. If NO in step S116, the processing routine is returned to step S101. If YES, step S117 follows and the video data is read out from the main memory 18.

In step S118, the processing routine advances to either one of the following three steps S119, S120, and S121 in accordance with an output signal of the movement detector 39. The movement detector 39 compares the image data of the adjacent frames of the video signal. When a difference between those image data is large, it is decided that the image is an image which moves (moving image). On the contrary, when the difference is small, it is determined that the image is an image without a movement (still image). As a result of the judgment, in case of the still image, step S119 follows and the speed is higher than the (N) times-speed by only α. On the other hand, when the difference is about an intermediate value, step S120 follows and the (N) times-speed search is executed. When the difference is extremely large, in step S121, the searching operation is executed at a speed that is slower than the (N) times-speed by only α. A loop process in steps S118 to S121 is executed until the video search switch is turned off.

The movement detector 39 judges by an integration amount for a certain period of time. In the switching judgment of large, middle, and small, by setting a threshold level like a window comparator, a stable search image is obtained while observing the monitor.

An audio search of a timer skip in which the audio data is reproduced at every predetermined time in case of the audio search will now be described.

The timer skip audio search will now be described with reference to FIGS. 14A and 14B.

FIG. 14A shows an audio signal in which an axis of abscissa denotes a time and an axis of ordinate indicates a level.

FIG. 14B shows a period to extract the audio data in case of searching the audio data of the audio signal.

In the embodiment, the searching operation is executed for a predetermined time interval (=M). In the time interval (M), a period of time to extract the audio data is set to (N). The audio data is searched at a speed that is M/N times as high as the ordinary speed.

Since the audio information exists from 0 for the first period of 0 to I, the audio search is started from the timing 0 and the audio data is extracted until the timing (N). Since no audio information exists at a start point of I in the next search period I to II, the search point is shifted to the (A) point at which audio data exists. The audio data is extracted for only a period of time of (N) from the (A) point and is generated as audio information.

Similarly, the search operation is also started from a (B) point at which the audio information exists for a period of time of II to III and the audio data is extracted until the period (N) and is generated. The presence or absence of the audio data is discriminated by the silent portion detector 38. The result of the discrimination is given to the system controller 16. The search periods (M and N) are produced by an internal program.

Figure 15:
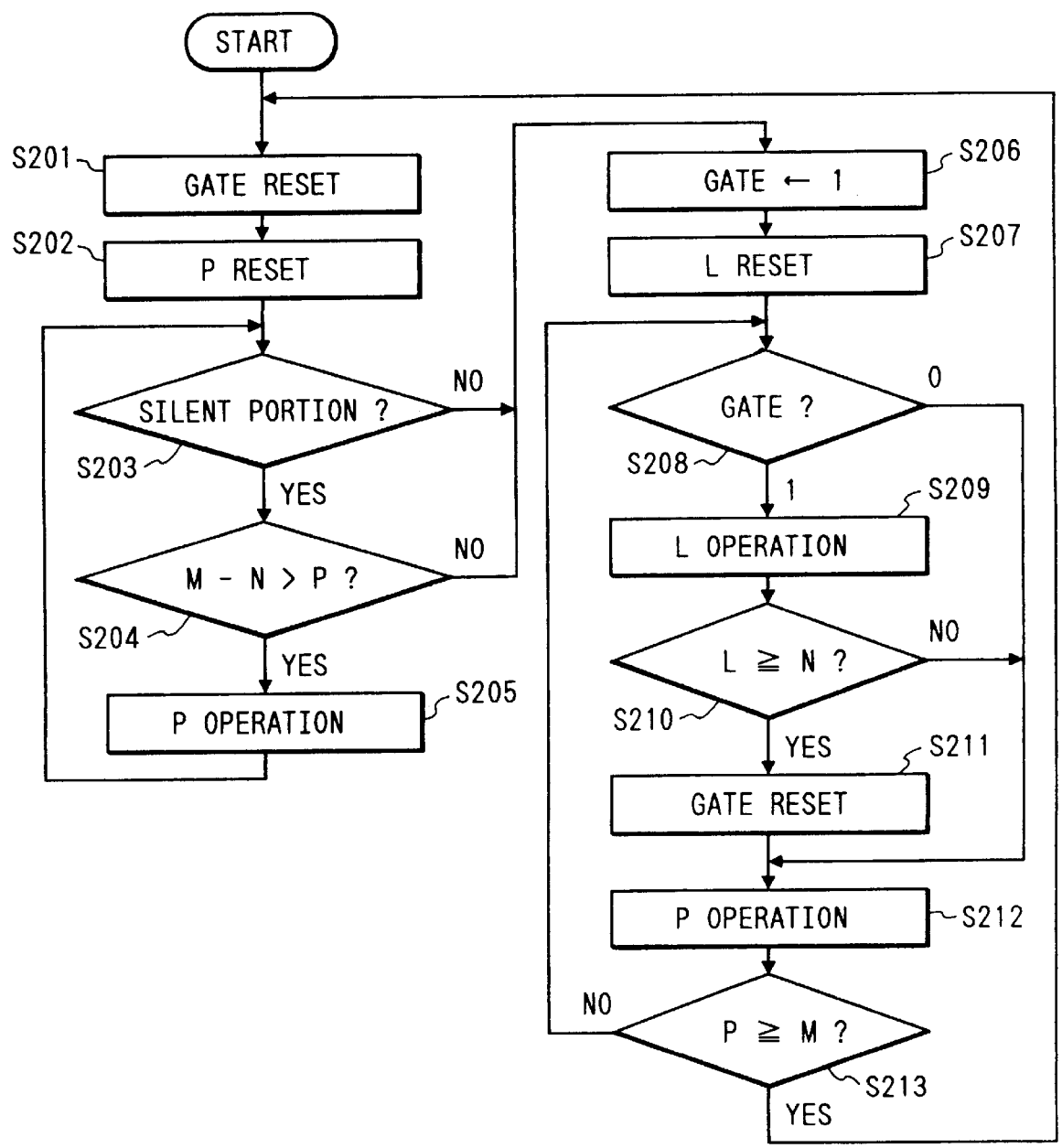
FIG. 15 is a flowchart for explaining the retrieving operation of FIGS. 14A and 14B.

A method of deciding the search periods (M and N) will now be described with reference to a flowchart of FIG. 15.

When the audio search mode switch of the operation unit 19 is operated, the flow is started.

In step S201, a flag of GATE indicative of the reading operation of the audio data in the system controller 16 is reset. In step S202, a counter (P) to count the search period in the system controller 16 is reset.

In step S203, the presence or absence of the audio signal is judged by the silent portion detector 38. When the silent portion is detected, step S204 follows. As mentioned above, (M) indicates the predetermined interval to search as mentioned above and (N) denotes a period of time to extract the audio data. A check is made to see if the value of (M−N) is larger than the count value of the counter (P) or not. If YES, the counter (P) is made operative in step S205 and the silent portion period is counted. The flow until now is executed to prevent that the audio extracting period (N) exceeds the audio search period (M) in FIGS. 14A and 14B.

The above loop process is repeated until the value of the counter (P) is larger than the value of (M−N) or until the audio signal indicates the sound portion. When either one of the above two conditions is satisfied, step S206 follows and the GATE flag is set. In step S207, a counter (L) to count the sound period in the system controller 16 is reset. In step S208, a check is made to see if the GATE flag has been set or not. When the GATE flag is set to the high level, step S209 follows.

In step S209, the counter (L) is made operative. In step S210, the count value of the counter (L) is compared with the constant (N). When the count value of the counter (L) is equal to or larger than the constant (N), step S211 follows. The flow until now is executed in order to generate pulses for the audio extracting period (N) in FIGS. 14A and 14B.

When the count value of the counter (L) coincides with the value of the audio search period (N), step S211 follows and the GATE flag is reset. That is, a period of time during which the GATE flag is at the high level corresponds to the audio search period (N).

When the counter (P) is in the inoperative mode, it is made operative in step S212. In step S213, the value of the counter (P) is compared with the constant (M). When the count value (P) is equal to or larger than the constant (M), the processing routine is returned to step S201. When the count value (P) is smaller than the constant (M), the processing routine is returned to step S208. Due to this, one cycle of the search period (M) in FIGS. 14A and 14B is formed.

A route which jumps to step S212 when the GATE flag is at the low level in step S208 is a route to form the time until the audio search period (M) after completion of the audio extracting period (N). Each process of the flow in FIG. 15 is stopped at a time point when the audio search r switch is turned off.

Even in the embodiment as described above, the audio information, video information, and retrieval information are recorded on a data block unit basis by using the solid-state memory device, the video and audio data can be recorded or reproduced without using any of the mechanical parts as in the VTR. In addition, in the retrieving mode, the search speed is changed in accordance with the audio information or video information. Thus, the retrieving efficiency of each information can be improved.

In case of the audio search mode, the sound portion is searched at an (N) times-speed and the silent portion is searched at a speed higher than the (N) times-speed. The sound portion after the silent portion continued after the elapse of a predetermined time or longer is searched at a speed slower than the (N) timers-speed. Therefore, the portion like a silent portion in which unnecessary information has been recorded can be rapidly listened and skipped and only the portion in which the sound data exists can be effectively searched. The effective information can be rapidly retrieved.

In case of the video search, the still image of a small movement is searched at a speed higher than the (N) timers-speed and the video image with a rapid movement is searched at a speed slower than the (N) times-speed. Due to this, the portion like a still image in which a change amount of information is small is promptly skipped and seen, so that the retrieving time can be reduced while maintaining the picture quality. With respect to a video image with a rapid movement, even when there is a movement, the image can be easily confirmed.

Further, in the audio search, by performing a time skip to reproduce the information at every predetermined interval, the silent portion or the portion near it is shifted and only the portion having information is extracted. Thus, the retrieval can be further efficiently performed.

As shown in FIG. 16, by using a recording-reproduction apparatus 100 shown in FIG. 1 together with an image pickup unit 101, the invention can be also used as a camera integrated type recording-reproduction apparatus and similar operation and effects are also obtained.

What is claimed is:

1. An image data processing apparatus, comprising:
   (a) an apparatus body;
   (b) storing means for storing moving image data, said storing means being within said apparatus body;
   (c) reading means for reading out the moving image data from said storing means, said reading means reading out a plurality of moving image data from said storing means simultaneously, said reading means being within said apparatus body;
   (d) processing means having a memory for storing moving image data read out from said storing means, said processing means for processing the plurality of moving image data read out from said storing means so that a plurality of moving images each corresponding to the plurality of moving image data are simultaneously displayed by using the memory, said processing means being within said apparatus body; and
   (e) output means for outputting the moving image data processed by said processing means.

2. An apparatus according to claim 1, wherein said reading means read out each of the plurality of moving image data from each of a plurality of reading portions of said storing means.

3. An apparatus according to claim 1, further comprising: display means which can display images associated with the moving image data output from said output means, onto multipicture planes.

4. An apparatus according to claim 1, wherein said storing means includes a solid state memory.

5. An image data processing apparatus, comprising:
   a storing device in which moving image signals and audio signals are stored, said storing device being capable of simultaneously outputting a plurality of moving image signals which represent different moving images;
   an audio processing device for processing the audio signals read out from said storing device and outputting the processed audio signals; and
   an image processing device for multiplexing the plurality of image signals read out from said storing device into one channel of image signals which is capable of simultaneously displaying the moving images and outputting said one channel of image signals to a peripheral device,
   wherein said audio processing device is controlled according to a number N of the moving image signals which are read out from said storing device, N being an integer equal to or greater than 1,
   and wherein said storing device, said audio processing device and said image processing device are secured in the apparatus.

6. An apparatus according to claim 5, wherein said image storing device includes a solid state memory.

7. An apparatus according to claim 5, wherein said image processing device has a memory for temporarily storing said one channel of image signals, said image processing device reading out said one channel of image signals from the memory and outputting said one channel of image signals to a display device, the plurality of moving images corresponding to said one channel of image signals being displayed by said display device.

8. An apparatus according to claim 5, wherein said audio processing device outputs the processed audio signals when single moving image signals are read out from said storing device and stops outputting the processed audio signals when a plurality of moving image signals are read out from said storing device.

9. An apparatus according to claim 5, wherein said apparatus has a first state in which single moving image signals are read out from said storing device and said image processing device outputs the processed audio signals and a second state in which a plurality of moving image signals are read out from said storing device and said audio processing device stops outputting the processed audio signals.

* * * * *

UNITED STATES PATENT AND TRADEMARK OFFICE
CERTIFICATE OF CORRECTION

PATENT NO. : 5,875,298
DATED : February 23, 1999
INVENTOR(S) : Isao Harigaya and Koji Takahashi It is certified that error appears in the above-identified patent and that said Letters Patent is hereby corrected as shown below:

Column 3, line 23, delete "writting/reading" and insert therefor -- writing/reading --.

Column 3, line 25, delete "node" and insert therefor -- code --.

Column 3, lines 40-41, delete "circuit is" and insert therefor -- circuit 15 --.

Column 11, line 6, delete "Figs. 11A to 1D" and insert therefor -- Figs. 11A - 11D --.

Column 15, line 40, delete "search r switch" and insert therefor -- search switch --.

Signed and Sealed this

Seventh Day of September, 1999

Attest:

Q. TODD DICKINSON

*Attesting Officer*   *Acting Commissioner of Patents and Trademarks*